United States Patent
Lu

(10) Patent No.: US 7,363,200 B2
(45) Date of Patent: Apr. 22, 2008

(54) APPARATUS AND METHOD FOR ISOLATING NOISE EFFECTS IN A SIGNAL

(75) Inventor: Joseph Z. Lu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 383 days.

(21) Appl. No.: 10/773,017

(22) Filed: Feb. 5, 2004

(65) Prior Publication Data

US 2005/0177349 A1    Aug. 11, 2005

(51) Int. Cl.
| | |
|---|---|
| G06F 7/60 | (2006.01) |
| G06F 7/00 | (2006.01) |
| G06F 7/38 | (2006.01) |
| G06F 7/32 | (2006.01) |
| G06F 7/22 | (2006.01) |
| G06F 17/10 | (2006.01) |
| G06F 17/00 | (2006.01) |
| G06F 15/00 | (2006.01) |
| H03F 1/26 | (2006.01) |
| H04B 15/00 | (2006.01) |
| G05B 13/02 | (2006.01) |
| G05B 13/00 | (2006.01) |
| G10L 15/00 | (2006.01) |

(52) U.S. Cl. .......... 703/2; 702/196; 702/197; 702/190; 702/191; 708/514; 708/520; 708/607; 706/22; 700/54; 700/55; 704/236

(58) Field of Classification Search .......... 703/2, 703/3; 702/196–197, 190–191; 708/514, 708/520, 607; 706/22; 700/54–55; 704/236
See application file for complete search history.

(56) References Cited

U.S. PATENT DOCUMENTS

| | | | |
|---|---|---|---|
| 4,740,968 A | 4/1988 | Aichelmann, Jr. |
| 5,490,516 A | 2/1996 | Hutson |
| 5,706,402 A | 1/1998 | Bell |
| 5,980,097 A | 11/1999 | Dagnachew |
| 5,991,525 A | 11/1999 | Shah et al. |
| 6,026,334 A | 2/2000 | Kayihan et al. |
| 6,510,354 B1 | 1/2003 | Lin |
| 6,564,176 B2 | 5/2003 | Kadtke et al. |

(Continued)

OTHER PUBLICATIONS

Ku et al. "Preconditioned Iterative Methods for Solving Toeplitz-Plus-Hankel Systems", IEEE, 1992, pp. 109-112.*

(Continued)

*Primary Examiner*—Kamini Shah
*Assistant Examiner*—Suzanne Lo
(74) *Attorney, Agent, or Firm*—Munck Butrus Carter PC

(57) ABSTRACT

A matrix includes samples associated with a first signal and samples associated with a second signal. The second signal includes a first portion associated with the first signal and a second portion associated with at least one disturbance, such as white noise or colored noise. A projection of the matrix is produced using canonical QR-decomposition. Canonical QR-decomposition of the matrix produces an orthogonal matrix and an upper triangular matrix, where each value in the diagonal of the upper triangular matrix is greater than or equal to zero. The projection at least substantially separates the first portion of the second signal from the second portion of the second signal.

27 Claims, 7 Drawing Sheets

U.S. PATENT DOCUMENTS

| | | | |
|---|---|---|---|
| 6,615,164 B1* | 9/2003 | Gopisetty et al. | 703/2 |
| 6,622,117 B2 | 9/2003 | Deligne et al. | |
| 6,757,569 B2 | 6/2004 | Lin | |
| 6,907,513 B2 | 6/2005 | Nakanishi | |
| 7,003,380 B2 | 2/2006 | MacMartin et al. | |
| 7,035,357 B2* | 4/2006 | Bonhomme | 375/343 |
| 7,089,159 B2 | 8/2006 | Hachiya | |
| 2003/0004658 A1* | 1/2003 | Bechhoefer et al. | 702/56 |
| 2003/0061035 A1* | 3/2003 | Kadambe | 704/203 |
| 2004/0057585 A1 | 3/2004 | Madievski et al. | |
| 2004/0071103 A1 | 4/2004 | Henttu | |
| 2004/0071207 A1* | 4/2004 | Skidmore et al. | 375/233 |
| 2004/0078412 A1 | 4/2004 | Nakanishi | |
| 2005/0015205 A1* | 1/2005 | Repucci et al. | 702/10 |

OTHER PUBLICATIONS

Swinnen et al. "Detection and multichannel SVD-based filtering of trigeminal somatosensory evoked potentials" Medical & Biological Engineering & Computing, 2000, vol. 38, pp. 297-305.*

Usefi et al. "A Note on Minors of a Generalized Hankel Matrix" Intern. Math. Journal, vol. 3, 2003, No. 11, 1197-1201.*

Moonen et al. "On- and off-line identification of linear state-space models" Int. K. Control, 1989, vol. 29, No. 1, 8 pages.*

Olshevesky et al. "Matrix-vector Product for Confluent Cauchy-like Matrices with Application to Confluent Rational Interpolation", ACM, 2000, pp. 573-581.*

Dooren, Paul. "Numerical Linear Alegra for Signals Systems and Control" Apr. 24, 2003, 161 pages.*

Strang, Gilbert. "Introduction to Linear Algebra" $3^{rd}$ ed. 2003, Wellesley-Cambridge Press, 10 pages.*

Salmeron et al. "SSA, SVD, QR-cp, and RBF Model Reduction", 2002, Springer-Verlag, 6 pages.*

Blackford, Susan. "Singular Value Decomposition" Jan. 10, 1999, http://www.netlib.org/lapack/lug/node53.html, 3 pages.*

Bochkanov et al. "Singular Value Decomposition" 2007, Algibnet, http://www.alglib.net/matrixops/general/svd.php, 4 pages.*

Sima V. et al., "Effectient numerical algorithms and software for subspace-based system identification", Proceedings of the 2000 IEEE Int'l Symposium, Sep. 25-27, p. 1-6, AL.

Cho Y.M., et al., "Fast recursive identification of state space models via exploitation of displacement structure", Automatica, vol. 30, No. 1, Jan. 1994, p. 45-49, Pergamon.

Zhang et al., "Blind Deconvolution of Dynamical Systems: A State-Space Approach," Journal of Signal Processing vol. 4, No. 2, Mar. 2000, pp. 111-130.

Cardoso, J.F., "Blind signal separation: statistical principles," Proc. Of the IEEE vol. 86, No. 10, pp. 2009-2026, 1998.

Sarajedini et al., "Blind signal separation with a projection pursuit index," 1998, IEEE, pp. 2125-2128.

* cited by examiner

US 7,363,200 B2

APPARATUS AND METHOD FOR ISOLATING NOISE EFFECTS IN A SIGNAL

CROSS REFERENCE TO RELATED APPLICATIONS

This patent application is related to U.S. patent application Ser. No. 10/772,971 entitled "APPARATUS AND METHOD FOR MODELING RELATIONSHIPS BETWEEN SIGNALS" filed on Feb. 5, 2005, which is incorporated by reference.

TECHNICAL FIELD

This disclosure relates generally to signal processing systems and more specifically to an apparatus and method for isolating noise effects in a signal.

BACKGROUND

Signal processing systems are used in a wide variety of applications to process various types of signals. For example, a signal processing system may be used in a process control system to control the operation of a processing facility. As a particular example, the signal processing system could manage the use of valves in the processing facility using various signals related to the operation of the valves. Example processing facilities include manufacturing plants, chemical plants, crude oil refineries, and ore processing plants.

Conventional signal processing systems often process signals that suffer from noise or other disturbances. Conventional signal processing systems filter the signals using low-pass filters to remove the noise or other disturbances from the signals. Low-pass filters often cannot eliminate much of the noise or other disturbances from the signals without impeding the performance of the signal processing systems.

SUMMARY

This disclosure provides an apparatus and method for isolating noise effects in a signal.

In one aspect, a method includes receiving a matrix having a first plurality of samples associated with a first signal and a second plurality of samples associated with a second signal. The second signal has a first portion associated with the first signal and a second portion associated with at least one disturbance. The method also includes projecting the matrix so as to at least substantially separate the first portion of the second signal from the second portion of the second signal.

In another aspect, an apparatus includes at least one memory operable to store a matrix having a first plurality of samples associated with a first signal and a second plurality of samples associated with a second signal. The second signal has a first portion associated with the first signal and a second portion associated with at least one disturbance. The apparatus also includes at least one processor operable to perform canonical QR-decomposition on the matrix. The canonical QR-decomposition creates an orthogonal matrix and an upper triangular matrix. The upper triangular matrix has a plurality of values along a diagonal of the matrix. Each value is greater than or equal to zero, and the diagonal lies between an upper left corner and a lower right corner of the upper triangular matrix.

In yet another aspect, a computer program is embodied on a computer readable medium and operable to be executed by a processor. The computer program includes computer readable program code for generating a matrix having a first plurality of samples associated with a first signal and a second plurality of samples associated with a second signal. The second signal has a first portion associated with the first signal and a second portion associated with at least one disturbance. The computer program also includes computer readable program code for decomposing the matrix so as to form a projection of the matrix. The projection at least substantially separates the first portion of the second signal from the second portion of the second signal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
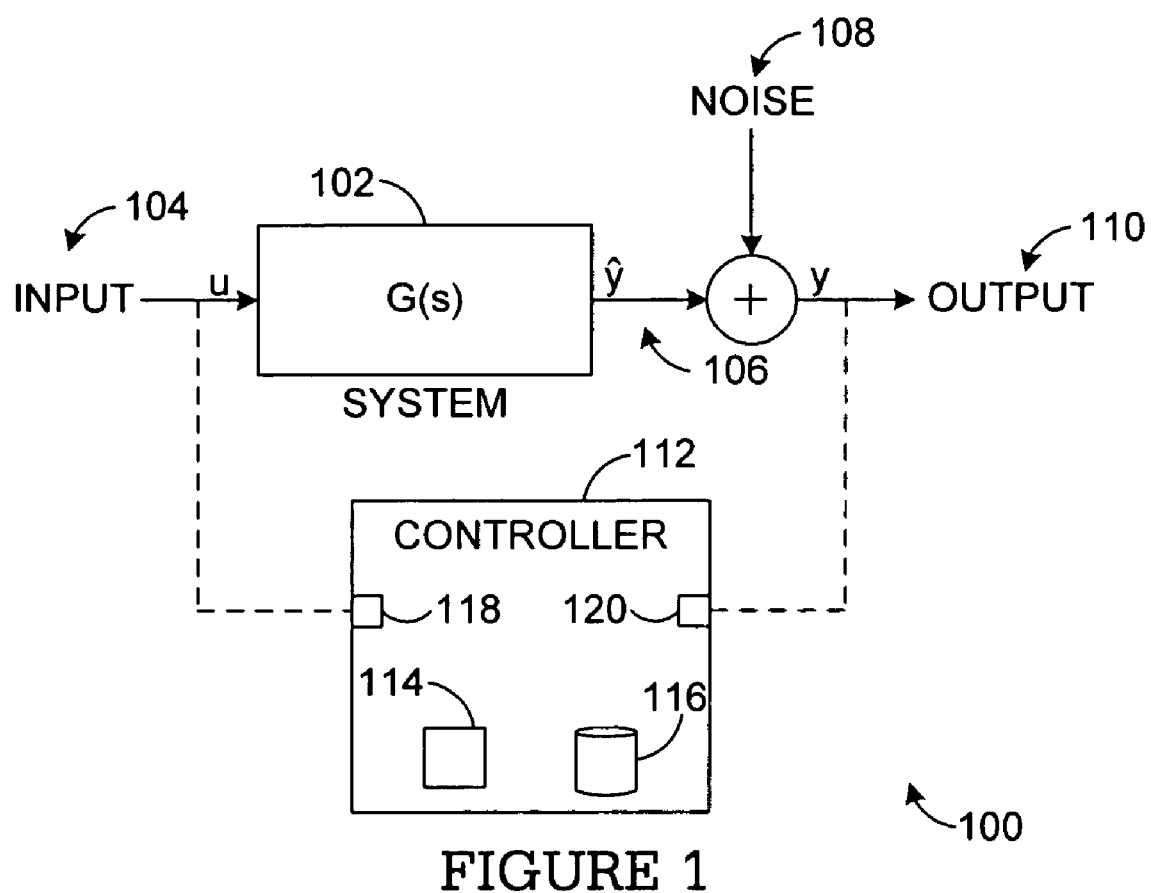
FIG. 1 illustrates an example system for isolating noise effects in a signal according to one embodiment of this disclosure.

FIG. 1 illustrates an example system 100 for isolating noise effects in a signal according to one embodiment of this disclosure. The system 100 shown in FIG. 1 is for illustration only. Other embodiments of the system 100 may be used without departing from the scope of this disclosure.

In this example embodiment, the system 100 includes a monitored system 102. The monitored system 102 represents any suitable system for producing or otherwise receiving an input signal 104 and producing or otherwise providing an ideal output signal 106. In some embodiments, the monitored system 102 is represented by a process model G(s), which represents the transformation of the input signal 104 into the output signal 106.

The monitored system 102 may represent any type of system. The monitored system 102 could, for example, represent a manufacturing or other processing system or a communication system. As a particular example, the monitored system 102 could represent a manufacturing plant having various valves that are controlled based on the input signal 104 and/or the ideal output signal 106. The monitored system 102 could also represent a communication system where the input signal 104 represents a signal transmitted by a mobile telephone and the ideal output signal 106 represents the ideal signal to be received by a base station.

As shown in FIG. 1, the ideal output signal 106 is often corrupted by some type of noise or other disturbance 108. This leads to the creation of an actual output signal 110. The actual output signal 110 includes a first portion associated with the input signal 104 and a second portion associated with the noise 108. These two portions often overlap, making it difficult to separate them. The noise or other disturbance 108 could represent any suitable disturbance to the ideal output signal 106, such as white noise or colored noise. As a particular example, the monitored system 102 could represent a production system, and the noise 108 could represent white noise introduced into an ideal output signal 106 before the signal 106 is received by a valve controller.

In the example in FIG. 1, the system 100 includes a controller 112, which has access to the input signal 104 and the actual output signal 110. The controller 112 uses the input signal 104 and the actual output signal 110 to control the operation of the monitored system 102. For example, the controller 112 could represent a valve controller capable of controlling the opening and closing of valves in the monitored system 102. As another example, the controller 112 could represent a signal controller capable of analyzing the input signal 104 and the actual output signal 110 and adjusting one or more parameters used to transmit data in the system 100. The controller 112 includes any hardware, software, firmware, or combination thereof for controlling one or more aspects of operation of the system 100. As a particular example, the controller 112 could include one or more processors 114 and one or more memories 116 capable of storing data and instructions used by the processors. In this example, the controller 112 receives the input signal 104 through a first input 118 and the actual output signal 110 through a second input 120.

As shown in FIG. 1, the controller 112 only has access to an output signal 110 that has been altered because of noise or other disturbances 108. Conventional systems attempt to remove noise or other disturbances 108 from a signal 110 using low-pass filtering. Low-pass filters often cannot eliminate much of the noise or other disturbances 108 from a signal 110 without impeding the performance of the system 100.

To facilitate more accurate control over the monitored system 102, the controller 112 generates at least one matrix associated with the input signal 104 and the actual output signal 110. The controller 112 then generates a projection of the matrix using "canonical QR-decomposition." This projects the matrix into orthogonal space, where the projection at least partially separates the input signal 104, the portion of the actual output signal 110 corresponding to the input signal 104, and the portion of the actual output signal 110 corresponding to the noise or other disturbances 108. In this way, the controller 112 at least partially separates the effects of the input signal 104 in the output signal 110 from the effects of the noise 108 in the output signal 110. As a result, the controller 112 is able to more effectively isolate the effects of noise 108 in the actual output signal 110.

QR-decomposition refers to a matrix decomposition performed according to the following equation:

$$A=QR$$

where A represents a matrix being decomposed, Q represents an orthogonal matrix, and R represents an upper triangular matrix.

A problem with conventional QR-decomposition is that a given matrix A could be decomposed in different ways. For example, a given matrix A could be decomposed into $[Q_1 R_1]$, $[Q_2 R_2]$, or $[Q_3 R_3]$. This creates problems in isolating noise 108 in the actual output signal 110 because it means that the same matrix representing the same input signals 104 and actual output signals 110 could have different QR-decompositions.

Canonical QR-decomposition or "CQR decomposition" represents a unique QR-decomposition where the diagonal values in the triangular matrix R are greater than or equal to zero. The "diagonal values" in the matrix R represent the values along the diagonal between the upper left corner and the lower right corner of the matrix R. By preventing the diagonal values in the upper triangular matrix R from being less than zero, each matrix A can be uniquely decomposed. This helps to facilitate the separation of noise effects contained in the actual output signal 110. In some embodiments, software routines are used to decompose a matrix using canonical QR-decomposition. Example software to decompose a matrix using canonical QR-decomposition is shown in the Software Appendix.

Although FIG. 1 illustrates one example of a system 100 for isolating noise effects in a signal, various changes may be made to FIG. 1. For example, the functionality of the controller 112 could be implemented in any hardware, software, firmware, or combination thereof. Also, the functionality of the controller 112 could be used in any other apparatus, system, or environment. As particular examples, the functionality of the controller 112 could also be implemented in a monitor, modeling tool, evaluator, detector, adapter, or any other device or system.

Figure 2A:
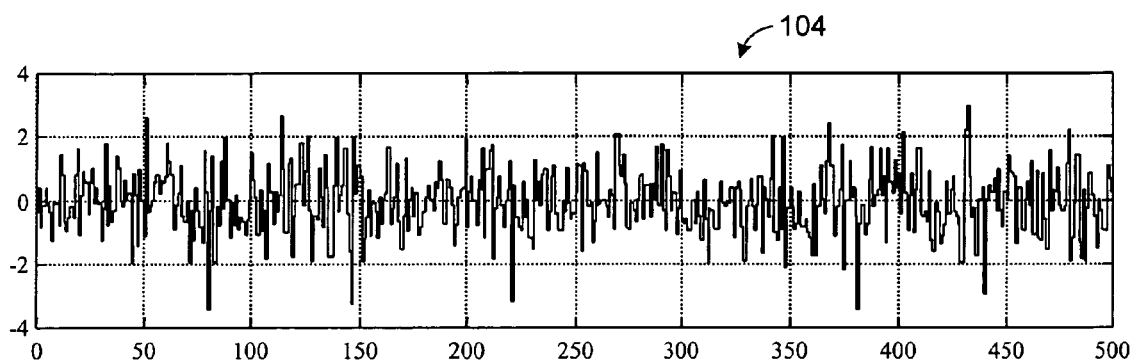
FIGS. 2A through 2C illustrate example signals in the system of FIG. 1 according to one embodiment of this disclosure.
Figure 2B:
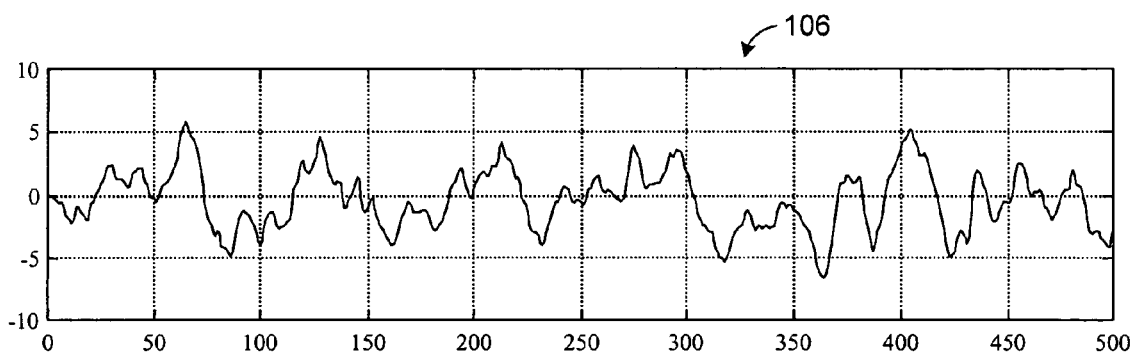
Figure 2C:
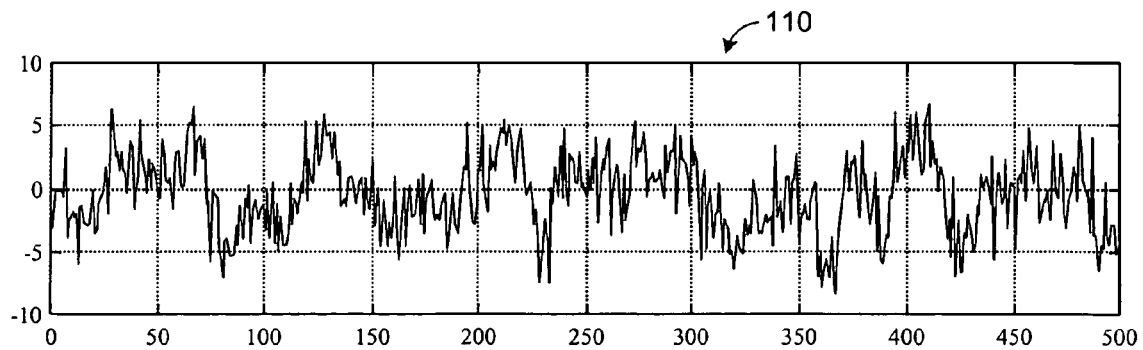

FIGS. 2A through 2C illustrate example signals in the system 100 of FIG. 1 according to one embodiment of this disclosure. The signals shown in FIGS. 2A through 2C are for illustration only. The system 100 of FIG. 1 or other system may receive, produce, or otherwise have access to any other signals without departing from the scope of this disclosure.

FIG. 2A illustrates an example input signal 104 received by the monitored system 102 in FIG. 1. In particular, FIG. 2A plots the values of five hundred samples of the input signal 104. As shown in FIG. 2A, the input signal 104 may vary widely over a small number of samples and over a longer period of time.

FIG. 2B illustrates an example ideal output signal 106 produced or otherwise provided by the monitored system 102 in FIG. 1. In particular, FIG. 2B plots the values of five hundred samples of the ideal output signal 106. As shown in FIG. 2B, this particular ideal output signal 106 varies but not as rapidly or widely as the input signal 104. Also, the ideal output signal 106 does not appear to include random peaks or valleys, which often indicate the presence of noise.

FIG. 2C illustrates an example actual output signal 110 produced or otherwise provided by the monitored system 102 in FIG. 1. In particular, FIG. 2C plots the values of five hundred samples of the actual output signal 110. As shown in FIG. 2C, the actual output signal 110 includes random peaks and valleys, indicating that the actual output signal 110 has been corrupted by noise or other disturbances 108.

The controller 112 or other monitor in the system 100 of FIG. 1 often has access only to the input signal 104 and the actual output signal 110. The controller 112 or other monitor generally lacks access to the ideal output signal 106. As shown in FIG. 2C, it is typically difficult to estimate or extract the ideal output signal 106 from the actual output signal 110. For example, running the actual output signal 110 through a low-pass filter could remove much, but not all, of the noise and also remove some of the ideal output signal 106.

As described above, the controller 112 separates the effects of noise 108 from the effects of the input signal 104 in the output signal 110. In particular, the controller 112 generates a matrix and performs canonical QR-decomposition to project the matrix into orthogonal space, where the input signal 104, the portion of the actual output signal 110 corresponding to the input signal 104, and the portion of the actual output signal 110 corresponding to the noise 108 are at least partially separated. In this way, the controller 112 or other monitor can at least partially separate the noise effects from the input effects in the actual output signal 110.

Although FIGS. 2A through 2C illustrate different examples of the signals in the system 100 of FIG. 1, various changes may be made to FIGS. 2A through 2C. For example, any other or additional signals may be present in the system 100 of FIG. 1 or in any other suitable system. Also, the various signals may represent any suitable information, such as information related to the operation of a valve in a production facility.

Figure 3A:
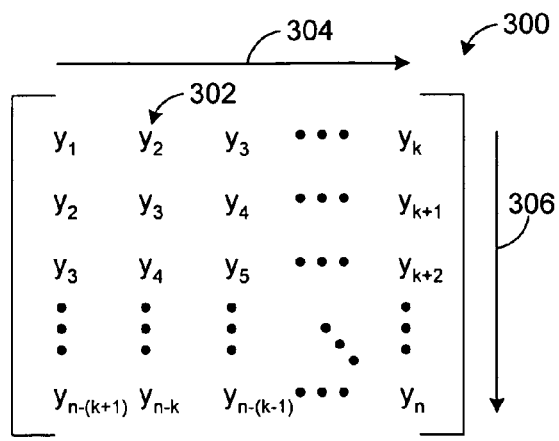
FIGS. 3A through 3C illustrate example matrices used to represent signals in the system of FIG. 1 according to one embodiment of this disclosure.
Figure 3B:
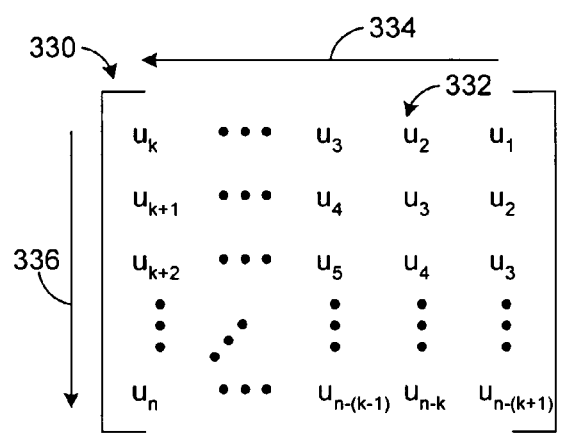
Figure 3C:
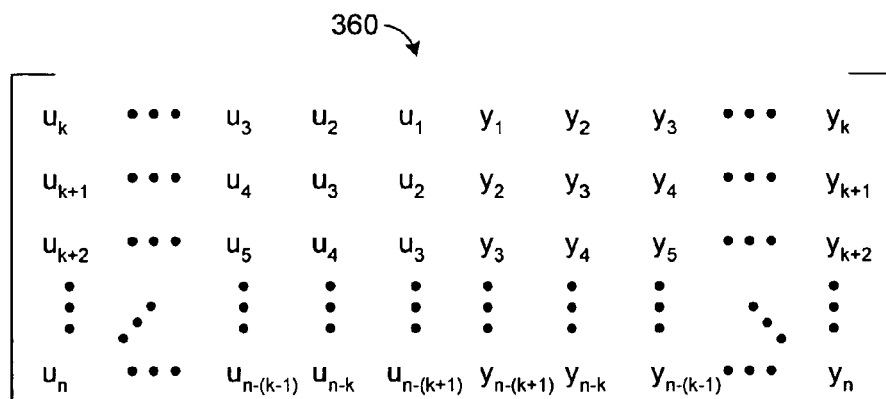

FIGS. 3A through 3C illustrate example matrices used to represent signals in the system of FIG. 1 according to one embodiment of this disclosure. The matrices shown in FIGS. 3A through 3C are for illustration only. The system 100 of FIG. 1 or other system may produce or otherwise use any other matrix or matrices without departing from the scope of this disclosure.

A matrix 300 in FIG. 3A contains samples 302 from the actual output signal 110. As shown in FIG. 3A, each row of the matrix 300 includes k samples 302 of the actual output signal 110, and each column of the matrix 300 includes n−(k+1) samples 302 of the actual output signal 110. In particular embodiments, the number of rows in the matrix 300 is much greater than the number of columns in the matrix 300, although any suitable number of rows and/or columns may be used.

At least some of the samples 302 of the actual output signal 110 appear multiple times in the matrix 300. For example, the sample 302 labeled "$y_2$" appears twice in a diagonal pattern, and the sample 302 labeled "$y_3$" appears three times in a diagonal pattern. Overall, the matrix 300 includes n different samples 302 of the actual output signal 110.

In this example, the matrix 300 represents a "column Hankel matrix." In this type of matrix, the matrix includes a time series of samples 302 in the horizontal direction 304 (left to right) and a time series of samples 302 in the vertical direction 306 (top to bottom). Because the samples 302 in the horizontal direction 304 form a time series in the left-to-right direction, the matrix 300 represents a "forward" column Hankel matrix.

A different matrix 330 is shown in FIG. 3B, which contains samples 332 of the input signal 104. Each row includes k samples, and each column includes n−(k+1) samples. As with the matrix 300 in FIG. 3A, the matrix 330 in FIG. 3B represents a column Hankel matrix. The matrix 330 includes a time series of samples 332 in the horizontal direction 334 and a time series of samples 332 in the vertical direction 336. However, the samples 332 in the matrix 330 represent a time series of samples 332 in the opposite horizontal direction 334 (right to left), so the matrix 330 represents a "backward" column Hankel matrix.

To isolate the effects of noise 108 in the actual output signal 110 from the effects of the input signal 104, the controller 112 may generate the matrices 300, 330 using the samples 302, 332 of the actual output signal 110 and the input signal 104. The controller 112 then generates a matrix 360, which is shown in FIG. 3C. The matrix 360 includes both the backward column Hankel matrix 330 representing the input signal 104 and a forward column Hankel matrix 300 representing the actual output signal 110. After generating the matrix 360, the controller 112 or other monitor decomposes the matrix 360 using CQR decomposition to project the matrix 360 into orthogonal space. The projection at least partially separates the noise effects from the input effects in the actual output signal 110.

Although FIGS. 3A through 3C illustrate example matrices used to represent signals in the system of FIG. 1, various changes may be made to FIGS. 3A through 3C. For example, FIG. 3A shows a forward column Hankel matrix and FIG. 3B shows a backward column Hankel matrix. The matrix 300 in FIG. 3A could be formatted as a backward column Hankel matrix and/or the matrix 330 in FIG. 3B could be formatted as a forward column Hankel matrix.

FIGS. 4A through 4E illustrate example projections used to represent signals in the system of FIG. 1 according to one embodiment of this disclosure. The projections shown in FIGS. 4A through 4E are for illustration only. The system 100 of FIG. 1 or other system may produce or otherwise use any other projections without departing from the scope of this disclosure.

Figure 4A:
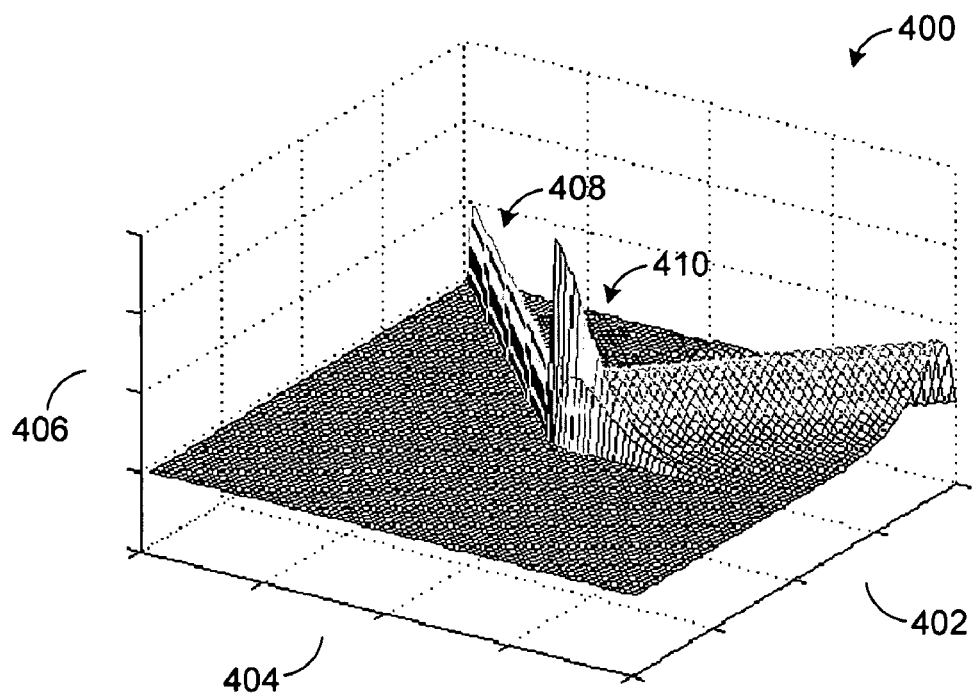
FIGS. 4A through 4E illustrate example projections used to represent signals in the system of FIG. 1 according to one embodiment of this disclosure.

FIG. 4A illustrates a projection 400 associated with a matrix 360, where the left portion of the matrix 360 represents a backward column Hankel matrix of the input signal 104 and the right portion represents a forward column Hankel matrix of the ideal output signal 106. In this example, the matrix 360 is denoted using the notation:

$$[U_b\ \hat{Y}]$$

where U represents a column Hankel matrix of the input signal 104, Ŷ represents a column Hankel matrix of the ideal output signal 106, and b indicates that a matrix is a backward column Hankel matrix. By default, any matrix without a b sub-notation represents a forward column Hankel matrix.

In this example, the matrix 360 is decomposed using CQR decomposition so as to project the matrix 360 into orthogonal space. The orthogonal space is defined by three axes 402, 404, 406. The first axis 402 represents an index of the rows in the decomposed matrix, and the second axis 404 represents an index of the columns in the decomposed matrix. Both indexes increase moving from left to right in FIG. 4A. The third axis 406 represents the values contained in the decomposed matrix 360.

As shown in FIG. 4A, the projection 400 of the matrix 360 includes two different portions 408 and 410. The first portion 408 represents the input signal 104, and the second portion 410 represents the ideal output signal 106. Because the second portion 410 represents the ideal output signal 106, the second portion 410 represents only the effects of the input signal 104 without any effects of noise or other disturbances 108.

Figure 4B:
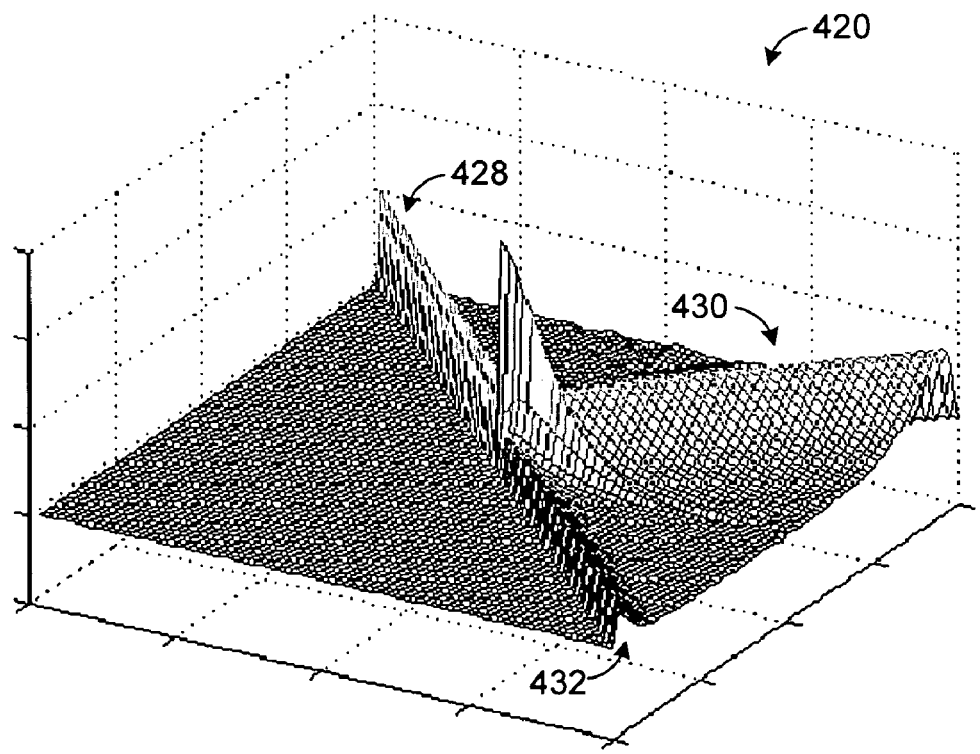

In contrast, FIG. 4B illustrates a projection 420 associated with a matrix 360, where the left portion of the matrix 360 represents a backward column Hankel matrix of the input signal 104 and the right portion represents a forward column Hankel matrix of the actual output signal 110. In this example, the matrix 360 is denoted using the notation:

$$[U_b\ Y]$$

where Y represents a column Hankel matrix of the actual output signal 110.

In this example, the matrix 360 is decomposed using CQR decomposition so as to project the matrix 360 into the same orthogonal space. As shown in FIG. 4B, the projection 420 of the matrix 360 includes three different portions 428, 430, 432. The first portion 428 represents the input signal 104.

The second portion 430 substantially represents the portion of the actual output signal 110 caused by the input signal 104. In other words, the second portion 430 of the projection 420 substantially represents the ideal output signal 106. The third portion 432 substantially represents the noise 108 contained in the actual output signal 110. Because the projection 420 substantially separates the response of the system 102 to the input signal 104 from the effects of noise 108, the controller 112 may more accurately process the actual output signal 110.

Figure 4C:
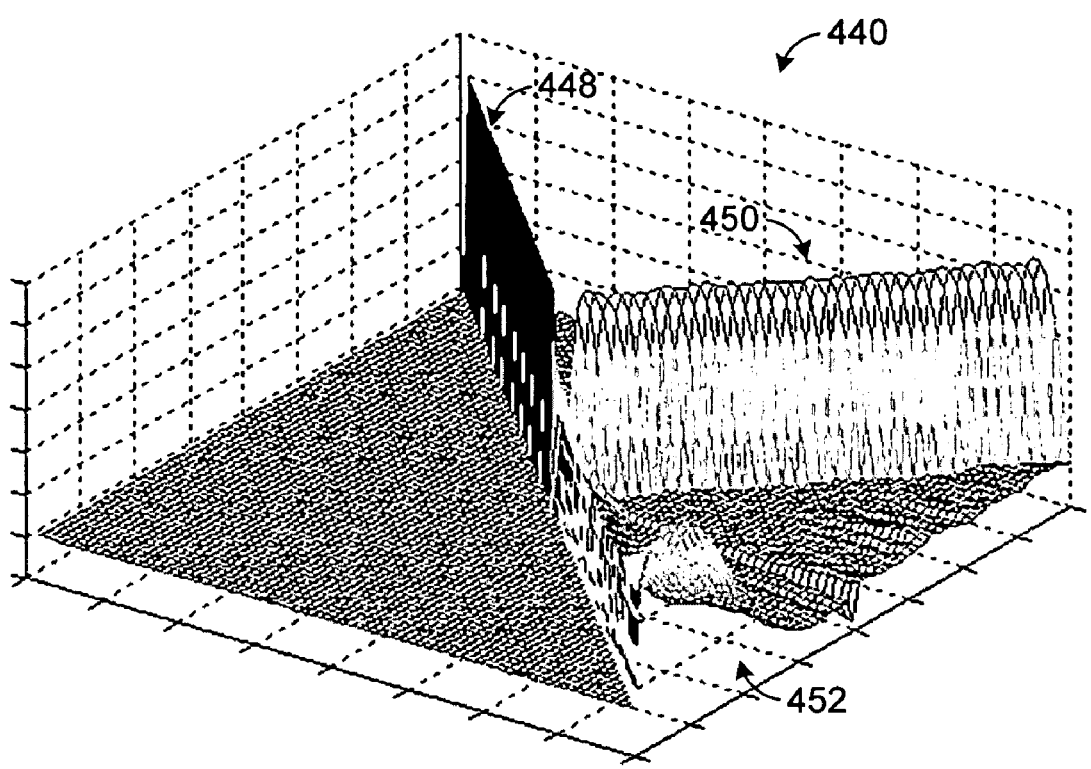

FIGS. 4A and 4B illustrate projections of matrices 360 that include a backward column Hankel matrix on the left side and a forward column Hankel matrix on the right side. Other matrices could be produced and then decomposed according to particular needs. For example, FIG. 4C illustrates a projection 440 associated with a matrix 360, where the left portion of the matrix 360 represents a forward column Hankel matrix of the input signal 104 and the right portion represents a backward column Hankel matrix of the actual output signal 110. In this example, the matrix 360 is denoted using the notation:

$$[U\ Y_b].$$

In this example, the matrix 360 is decomposed using CQR decomposition so as to project the matrix 360 into the orthogonal space. As shown in FIG. 4C, the projection 440 of the matrix 360 includes three different portions 448, 450, 452. The first portion 448 represents the input signal 104. The second and third portions 450, 452 represent the portion of the actual output signal 110 caused by the input signal 104 and the portion of the actual input signal 110 caused by noise 108. However, the second and third portions 450, 452 are interlaced.

Figure 4D:
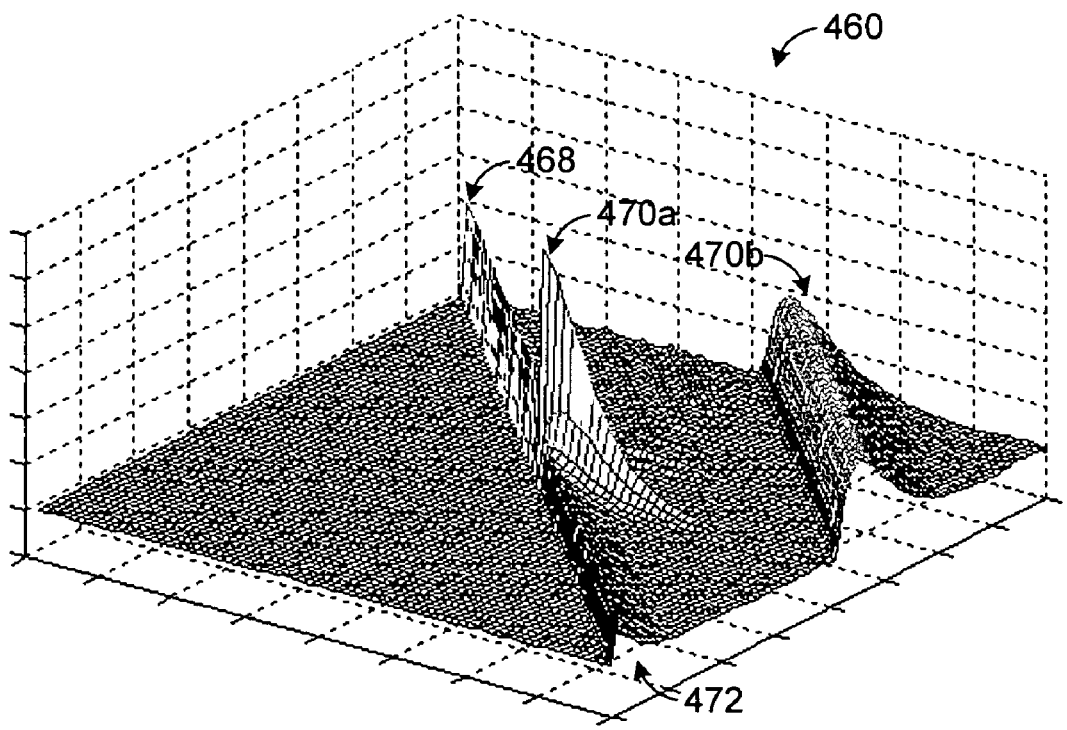

Similarly, FIG. 4D illustrates a projection 460 associated with a matrix 360, where the left portion of the matrix 360 represents a forward column Hankel matrix of the input signal 104 and the right portion represents a forward column Hankel matrix of the actual output signal 110. In this example, the matrix 360 is denoted using the notation:

$$[U\ Y].$$

In this example, the matrix 360 is decomposed using CQR decomposition so as to project the matrix 360 into the orthogonal space. As shown in FIG. 4D, the projection 460 of the matrix 360 includes four different portions 468, 470a-470b, 472. The first portion 468 represents the input signal 104. The second and third portions 470a-470b substantially represent the portion of the actual output signal 110 caused by the input signal 104. As shown in FIG. 4D, the portion of the actual output signal 110 caused by the input signal 104 has been dissected into two different parts 470a and 470b. The fourth portion 472 substantially represents the noise 108 contained in the actual output signal 110.

Figure 4E:
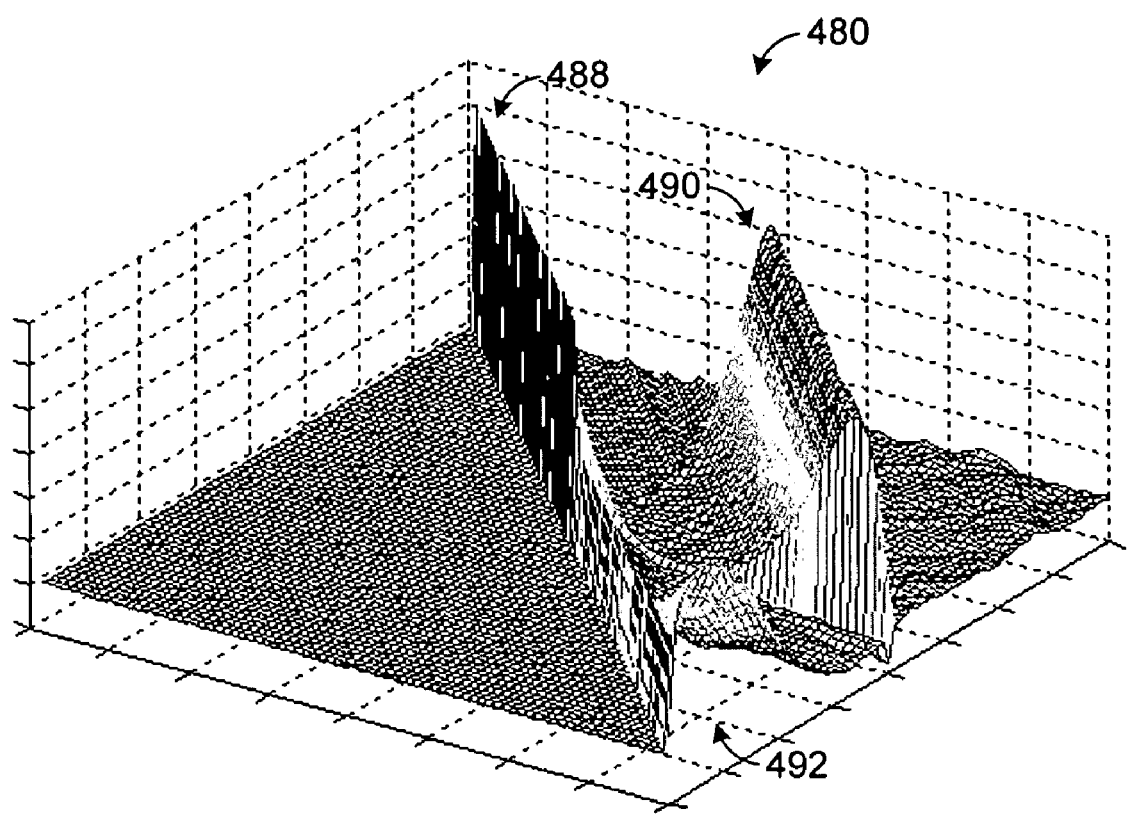

Finally, FIG. 4E illustrates a projection 480 associated with a matrix 360, where the left portion of the matrix 360 represents a backward column Hankel matrix of the input signal 104 and the right portion represents a backward column Hankel matrix of the actual output signal 110. In this example, the matrix 360 is denoted using the notation:

$$[U_b\ Y_b].$$

In this example, the matrix 360 is decomposed using CQR decomposition so as to project the matrix 360 into the orthogonal space. As shown in FIG. 4E, the projection 480 of the matrix 360 includes three different portions 488, 490, 492. The first portion 488 represents the input signal 104. The second and third portions 490, 492 represent the portion of the actual output signal 110 caused by the input signal 104 and the portion of the actual input signal 110 caused by noise 108. However, the second and third portions 490, 492 are interlaced.

Using one or more of these projections, the controller 112 or other monitor in the system 100 of FIG. 1 may more effectively process the various signals. For example, the controller 112 or other monitor could use the projection 420 in FIG. 4B to identify the effects of the input signal 104 in the actual output signal 110 and the effects of the noise 108 in the actual output signal 110. The controller 112 or other monitor could use this information in any suitable manner. For example, the controller 112 could disregard the effects of the noise 108 in the actual output signal 110 and process only the effects of the input signal 104 in the actual output signal 110. As another example, the controller 112 or other monitor could use this information to identify relationships between the input and output signals.

As can be seen in FIG. 3C, the matrix 360 used to form the projections shown in FIGS. 4A through 4E could become very large as the number of samples grows. For example, if each signal is represented by 10,000 samples, each matrix 300, 330 might have 1,000 columns (k) and 8,999 rows (n−(k+1)), and the matrix 360 would have 2,000 columns and 8,999 rows.

In some embodiments, to reduce the processing power and time needed by the controller 112 to process the signals, the controller 112 processes the samples in batches. For example, the controller 112 could process samples of the input signal 104 and actual output signal 110 in batches of five hundred samples each.

To help reduce the size of the matrix needed to generate a projection, the controller 112 may generate and process a first matrix 360 associated with a first batch of the samples. The first matrix 360 is decomposed into $Q_1$ and $R_1$. To process the next batch of samples, the controller 112 generates a matrix 360 for the next batch of samples and combines that matrix 360 with $R_1$. For example, the controller 112 could combine a new matrix 360 with a previous R matrix to create a concatenated matrix as follows:

$$\begin{bmatrix} R_{x-1} \\ Data_x \end{bmatrix}$$

where x represents the number of the current data segment (where $x \geq 2$), $Data_x$ represents the data samples in the x-th data segment, and $R_{x-1}$ represents the R matrix associated with the (x−1)-th data segment. The matrix resulting from this combination is then processed by the controller 112 and decomposed. This allows the controller 112 to process a smaller matrix, even as the total number of samples becomes very large.

In the example above, the samples in the previous data segments are continuously carried through the processing of future data segments. In effect, the controller 112 is concatenating the data segments together, and the projection corresponding to the x-th data segment represents all previous data segments. In other embodiments, the samples in previous data segments may be phased out of the processing of future data segments. In effect, this provides a "forgetting factor" where older data segments contribute less to the projection than newer data segments. For example, the controller 112 could combine a new matrix 360 with a previous R matrix as follows:

$$\begin{bmatrix} \lambda \times R_{x-1} \\ Data_x \end{bmatrix}$$

where λ represents a value between zero and one. A λ value of one would operate as described above. A λ value of zero causes the controller 112 to ignore the previous R matrix and only process the current data segment. A λ value between zero and one causes the controller 112 to partially consider the previous R matrix in forming the projection, which over time reduces the effects of older data segments to a greater and greater extent.

Although FIGS. 4A through 4E illustrate examples of different projections used to represent signals in the system 100 of FIG. 1, various changes may be made to FIGS. 4A through 4E. For example, the projections shown in FIGS. 4A through 4E are for illustration only. Other signals in the system 100 or other system would have different projections.

Figure 5:
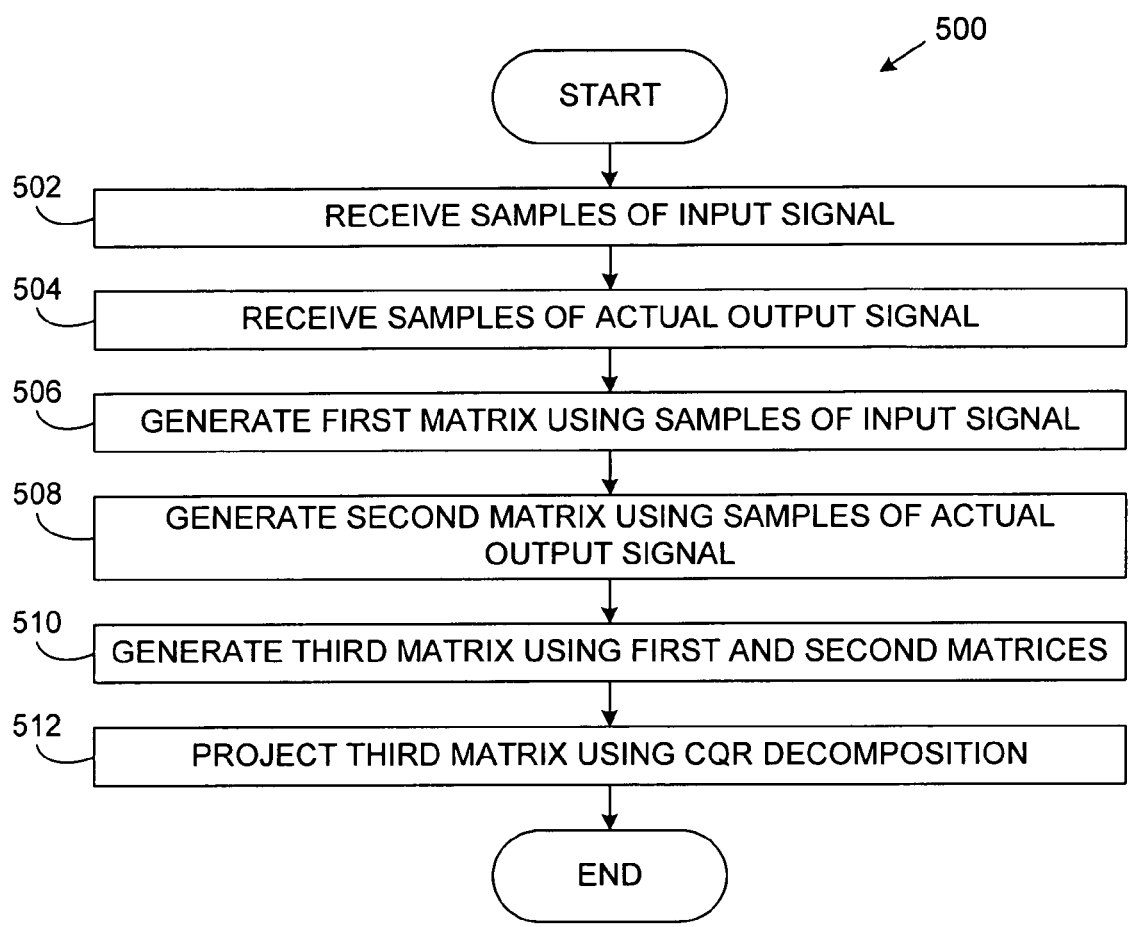
FIG. 5 illustrates an example method for isolating noise effects in a signal according to one embodiment of this disclosure.

FIG. 5 illustrates an example method 500 for isolating noise effects in a signal according to one embodiment of this disclosure. For ease of explanation, the method 500 is described with respect to the controller 112 operating in the system 100 of FIG. 1. The method 500 could be used by any other apparatus or device in any system.

The controller 112 receives samples of an input signal at step 502. This may include, for example, the controller 112 receiving samples of an input signal 104 or the controller 112 receiving the input signal 104 and generating the samples.

The controller 112 receives samples of an actual output signal at step 504. This may include, for example, the controller 112 receiving samples of an actual output signal 110 or the controller 112 receiving the actual output signal 110 and generating the samples.

The controller 112 generates a first matrix using the samples of the input signal at step 506. This may include, for example, the controller 112 generating a forward or backward column Hankel matrix 330 using the samples of the input signal 104.

The controller 112 generates a second matrix using the samples of the actual output signal at step 508. This may include, for example, the controller 112 generating a forward or backward column Hankel matrix 300 using the samples of the actual output signal 110.

The controller 112 generates a third matrix using the first and second matrices at step 510. This may include, for example, the controller 112 generating a third matrix 360 by concatenating the first and second matrices 300, 330.

The controller 112 projects the third matrix into orthogonal space at step 512. This may include, for example, the controller 112 performing CRQ decomposition to project the third matrix 360 into orthogonal space. This may also include the controller 112 generating a projection as shown in FIGS. 4A through 4E.

At this point, the controller 112 may use the projection in any suitable manner. For example, the controller 112 could use the projection to identify a model that relates the input signal 104 to the ideal output signal 106 contained in the actual output signal 110.

Although FIG. 5 illustrates one example of a method 500 for isolating noise effects in a signal, various changes may be made to FIG. 5. For example, the controller 112 could generate the third matrix at step 510 directly after the samples are collected at steps 502, 504. In this example, the controller 112 need not generate the first and second matrices at steps 506, 508.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

SOFTWARE APPENDIX

```
function [Q,R] =CQR_H(A,save)
% Usage: [Q,R] =CQR_H(A)
%              Q=CQR_H(A)
% This is CQR Household algorithm. It is as economical as
% the standard QR Household algorithm.
%for testing the algorithm accuracy
A0=A;
[n,m] =size(A);
n1=n+1;
%% trianglize A
mm=min(m,n-1);
for j=1:mm
    v=HouseHld(A(j:n,j));
    A(j:n,j:m)=HousePre(A(j:n,j:m),v);
    A(j+1:n,j)=v(2:(n1-j));
end
if nargout <= 1
Q=A;
else
    if nargin < 2 | n <= m
             R=zeros(size(A));
             Q=eye(n);
             ncol = n;
    elseif save == 0 & n > m
             R=zeros(m,m);
             Q= [eye(m);zeros(n-m,m)];
             ncol = m;
    else
             error('input format error'),
    end
    for j=mm:-1:1
        v= [1;A(j+1:n,j)];
        Q(j:n,j:ncol)=HousePre(Q(j:n,j:ncol),v);
        R(1:j,j)=A(1:j,j);
        if R(j,j) < 0;
             R(j,j:m) = -R(j,j:m);
             if nargout > 1
                 Q(j:n,j) = -Q(j:n,j);
             end
        end
    end
    for j=mm+1:m
        R(1:n,j)=A(1:n,j);
    end
```

SOFTWARE APPENDIX-continued

```
            if m >= n & R(n, n) < 0;
                R(n,n:m) = -R(n,n:m);
                if nargout > 1
                    Q(:,n) = -Q(:,n);
                end
            end
        end
function [v, P] =HouseHld(x,i)
%      v=HouseHld(x,i)
n=length(x);
nx=norm(x);
v=zeros(size(x));
if nargin == 1, i=1; end
ind= [1:i-1,i+1:n];
if nx > eps
    b=x(i)+sign(x(i))*nx;
    v(ind)=x(ind)/b;
else
    v(ind)=x(ind);
end
v(i)=1;
if nargout > 1
    P=eye(n)-(2*v)*(v'/(v'*v));
end
function A=HousePre(A,v)
% Usage: Ap=HousePre(A,v)
% Pre-multiply the Householder transformation P(v) to A
%         Ap = P(v)*A
A = A + ((-2/(v'*v))*v)*(v'*A);
%A = A - ((2/(v'*v))*v)*(v'*A);
% = (I -2/(v'*v)*(v*v')) * A
% thus,
% P(v) = I -2/(v'*v)*(v*v') -> symmetric
```

What is claimed is:

1. A method, comprising:

receiving a matrix comprising a first plurality of samples associated with a first signal and a second plurality of samples associated with a second signal, the second signal comprising a first portion associated with the first signal and a second portion associated with at least one disturbance;

projecting the matrix into an orthogonal space;

using the projected matrix to at least partially isolate the first portion of the second signal from the second portion of the second signal; and generating and storing a model associating the first signal and the isolated first portion of the second signal;

wherein the matrix comprises (i) a first column Hankel matrix comprising the first plurality of samples in a first portion of the matrix and (ii) a second column Hankel matrix comprising the second plurality of samples in a second portion of the matrix; and wherein the first column Hankel matrix comprises one of a backward column Hankel matrix and a forward column Hankel matrix, and the second column Hankel matrix comprises one of a backward column Hankel matrix and a forward column Hankel matrix.

2. The method of claim 1, wherein projecting the matrix comprises performing canonical QR-decomposition on the matrix, the canonical QR-decomposition creating an orthogonal matrix and an upper triangular matrix.

3. The method of claim 2, wherein:

the upper triangular matrix has a plurality of values along a diagonal of the matrix, each value being greater than or equal to zero; and the diagonal lies between an upper left corner and a lower right corner of the upper triangular matrix.

4. The method of claim 1, wherein projecting the matrix comprises projecting the first signal along with the second signal.

5. The method of claim 1, further comprising generating the matrix comprising the first and second plurality of samples.

6. The method of claim 1, wherein:

the first column Hankel matrix comprises a backward column Hankel matrix; and the second column Hankel matrix comprises a forward column Hankel matrix.

7. A method, comprising:

receiving a first matrix containing a first segment of samples including a first plurality of samples associated with a first signal and a second plurality of samples associated with a second signal, the second signal comprising a first portion associated with the first signal and a second portion associated with at least one disturbance;

projecting the first matrix into an orthogonal space to form an upper triangular matrix;

receiving a second matrix containing a second segment of samples;

concatenating the second matrix with the upper triangular matrix to form a concatenated matrix;

projecting the concatenated matrix;

using the projected concatenated matrix to at least partially isolate the first portion of the second signal from the second portion of the second signal; and generating and storing a model associating the first signal and the isolated first portion of the second signal.

8. The method of claim 7, wherein concatenating the second matrix with the upper triangular matrix comprises multiplying values in the upper triangular matrix by a forgetting factor.

9. The method of claim 7, wherein the at least one disturbance comprises at least one of: white noise and colored noise.

10. An apparatus, comprising:

at least one memory storing a matrix comprising a first plurality of samples associated with a first signal and a second plurality of samples associated with a second signal, the second signal comprising a first portion associated with the first signal and a second portion associated with at least one disturbance; and at least one processor:

performing canonical QR-decomposition on the matrix, the canonical QR-decomposition creating an orthogonal matrix and an upper triangular matrix, the upper triangular matrix having a plurality of values along a diagonal of the matrix, each value being greater than or equal to zero, the diagonal lying between an upper left corner and a lower right corner of the upper triangular matrix;

using the orthogonal matrix and the upper triangular matrix to at least partially isolate the first portion of the second signal from the second portion of the second signal; and generating and storing a model associating the first signal and the isolated first portion of the second signal;

wherein the matrix comprises (i) a first column Hankel matrix comprising the first plurality of samples in a first portion of the matrix and (ii) a second column Hankel matrix comprising the second plurality of samples in a second portion of the matrix; and wherein the first column Hankel matrix comprises one of a backward column Hankel matrix and a forward column Hankel matrix, and the second column Hankel matrix comprises one of a backward column Hankel matrix and a forward column Hankel matrix.

11. The apparatus of claim 10, wherein performing the canonical QR-decomposition allows the at least one processor to project the matrix into an orthogonal space so as to at least partially isolate the first portion of the second signal from the second portion of the second signal.

12. The apparatus of claim 11, wherein the at least one processor is operable to generate a projection that includes the first signal, the first portion of the second signal, and the second portion of the second signal.

13. The apparatus of claim 10, wherein the at least one processor is further operable to generate the matrix comprising the first and second plurality of samples.

14. The apparatus of claim 10, wherein:
the first column Hankel matrix comprises a backward column Hankel matrix; and
the second column Hankel matrix comprises a forward column Hankel matrix.

15. An apparatus, comprising:
at least one memory storing a first matrix containing a first segment of samples including a first plurality of samples associated with a first signal and a second plurality of samples associated with a second signal, the second signal comprising a first portion associated with the first signal and a second portion associated with at least one disturbance, wherein the first matrix comprises (i) a first column Hankel matrix comprising the first plurality of samples in a first portion of the first matrix and (ii) a second column Hankel matrix comprising the second plurality of samples in a second portion of the first matrix; and
at least one processor:
performing canonical OR-decomposition on the first matrix to form a first upper triangular matrix;
receiving a second matrix containing a second segment of samples;
concatenating the second matrix with the first upper triangular matrix to form a concatenated matrix;
performing canonical QR-decomposition on the concatenated matrix to form an orthogonal matrix and a second upper triangular matrix, the second upper triangular matrix having a plurality of values along a diagonal of the matrix, each value being greater than or equal to zero, the diagonal lying between an upper left corner and a lower right corner of the second upper triangular matrix;
using the orthogonal matrix and the second upper triangular matrix to at least partially isolate the first portion of the second signal from the second portion of the second signal; and
generating and storing a model associating the first signal and the isolated first portion of the second signal.

16. The apparatus of claim 15, wherein the at least one processor is further operable to multiply values in the first upper triangular matrix by a forgetting factor.

17. A computer program embodied on a computer readable medium, the computer program comprising:
computer readable program code that generates a matrix comprising a first plurality of samples associated with a first signal and a second plurality of samples associated with a second signal, the second signal comprising a first portion associated with the first signal and a second portion associated with at least one disturbance;
computer readable program code that decomposes the matrix so as to form a projection of the matrix in an orthogonal space;
computer readable program code that uses the projection to at least partially isolate the first portion of the second signal from the second portion of the second signal; and
computer readable program code that generates and stores a model associating the first signal and the isolated first portion of the second signal;
wherein the matrix comprises (i) a first column Hankel matrix comprising the first plurality of samples in a first portion of the matrix and (ii) a second column Hankel matrix comprising the second plurality of samples in a second portion of the matrix; and
wherein the first column Hankel matrix comprises one of a backward column Hankel matrix and a forward column Hankel matrix, and the second column Hankel matrix comprises one of a backward column Hankel matrix and a forward column Hankel matrix.

18. The computer program of claim 17, wherein the computer readable program code that decomposes the matrix comprises computer readable program code that performs canonical QR-decomposition on the matrix, the canonical QR-decomposition creating an orthogonal matrix and an upper triangular matrix.

19. The computer program of claim 18, wherein:
the upper triangular matrix has a plurality of values along a diagonal of the matrix, each value being greater than or equal to zero; and
the diagonal lies between an upper left corner and a lower right corner of the upper triangular matrix.

20. The computer program of claim 17, wherein the projection of the matrix comprises a projection of the first signal, the first portion of the second signal, and the second portion of the second signal.

21. The computer program of claim 17, wherein:
the first column Hankel matrix comprises a forward column Hankel matrix; and
the second column Hankel matrix comprises a backward column Hankel matrix.

22. The computer program of claim 17, wherein:
the first column Hankel matrix comprises a backward column Hankel matrix; and
the second column Hankel matrix comprises a forward column Hankel matrix.

23. A computer program embodied on a computer readable medium, the computer program comprising:
computer readable program code that generates a first matrix containing a first segment of samples including a first plurality of samples associated with a first signal and a second plurality of samples associated with a second signal, the second signal comprising a first portion associated with the first signal and a second portion associated with at least one disturbance;
computer readable program code that decomposes the matrix so as to form an upper triangular matrix;
computer readable program code that receives a second matrix containing a second segment of samples;
computer readable program code that concatenates the second matrix with the upper triangular matrix to form a concatenated matrix;
computer readable program code that decomposes the concatenated matrix so as to form a projection of the concatenated matrix;

computer readable program code that uses the projection of the concatenated matrix to at least partially isolate the first portion of the second signal from the second portion of the second signal; and computer readable program code that generates and stores a model associating the first signal and the isolated first portion of the second signal;

wherein the matrix comprises (i) a first column Hankel matrix comprising the first plurality of samples in a first portion of the matrix and (ii) a second column Hankel matrix comprising the second plurality of samples in a second portion of the matrix.

24. The computer program of claim 23, wherein the computer readable program code that concatenates the second matrix with the upper triangular matrix comprises computer readable program code that multiplies values in the upper triangular matrix by a forgetting factor.

25. A system, comprising:

a monitored system operable to receive a first signal and provide a second signal, the second signal comprising a first portion associated with the first signal and a second portion associated with at least one disturbance; and a controller comprising one or more hardware components, the controller operable to:

produce a matrix comprising a first plurality of samples associated with the first signal and a second plurality of samples associated with the second signal;

decompose the matrix so as to form a projection in an orthogonal space;

use the projection to at least partially isolate the first portion of the second signal from the second portion of the second signal; and generate and store a model associating the first signal and the isolated first portion of the second signal;

wherein the matrix comprises (i) a first column Hankel matrix comprising the first plurality of samples in a first portion of the matrix and (ii) a second column Hankel matrix comprising the second plurality of samples in a second portion of the matrix; and wherein the first column Hankel matrix comprises one of a backward column Hankel matrix and a forward column Hankel matrix, and the second column Hankel matrix comprises one of a backward column Hankel matrix and a forward column Hankel matrix.

26. A method, comprising:

performing canonical QR-decomposition on a matrix, the canonical QR-decomposition creating an orthogonal matrix and an upper triangular matrix;

using the orthogonal matrix and the upper triangular matrix to at least partially isolate one or more effects of one or more disturbances in a signal; and generating and storing a model associated with the signal that has had the one or more effects of the one or more disturbances isolated;

wherein the upper triangular matrix has a plurality of values along a diagonal of the upper triangular matrix, each value being greater than or equal to zero, the diagonal lying between an upper left corner and a lower right corner of the upper triangular matrix;

wherein the matrix comprises a first column Hankel matrix in a first portion of the matrix and a second column Hankel matrix in a second portion of the matrix; and wherein the first column Hankel matrix comprises one of a backward column Hankel matrix and a forward column Hankel matrix, and the second column Hankel matrix comprises one of a backward column Hankel matrix and a forward column Hankel matrix.

27. The method of claim 1, further comprising:

controlling at least a portion of a process using the model.

* * * * *

UNITED STATES PATENT AND TRADEMARK OFFICE
CERTIFICATE OF CORRECTION

PATENT NO. : 7,363,200 B2 Page 1 of 1
APPLICATION NO. : 10/773017
DATED : April 22, 2008
INVENTOR(S) : Joseph Z. Lu It is certified that error appears in the above-identified patent and that said Letters Patent is hereby corrected as shown below:

In Column 13, line 37, delete "OR" and add --QR--.

Signed and Sealed this

Eighth Day of July, 2008

JON W. DUDAS
*Director of the United States Patent and Trademark Office*